US011273616B2

(12) United States Patent
Bahorich et al.

(10) Patent No.: US 11,273,616 B2
(45) Date of Patent: Mar. 15, 2022

(54) COMPOSITE TUBE WITH AN EMBEDDED STRANDED WIRE AND METHOD FOR MAKING THE SAME

(71) Applicant: Eaton Intelligent Power Limited, Dublin (IE)

(72) Inventors: Phillip A. Bahorich, Laguna Hills, CA (US); Daniel J. McCandlish, Cullompton (GB); Simon Clarke, Ilfracombe (GB); Martyn C. Isaac, South Molton (GB)

(73) Assignee: Eaton Intelligent Power Limited, Dublin (IE)

( * ) Notice: Subject to any disclaimer, the term of this patent is extended or adjusted under 35 U.S.C. 154(b) by 690 days.

(21) Appl. No.: 15/767,818

(22) PCT Filed: Oct. 14, 2016

(86) PCT No.: PCT/US2016/057082
§ 371 (c)(1),
(2) Date: Apr. 12, 2018

(87) PCT Pub. No.: WO2017/066598
PCT Pub. Date: Apr. 20, 2017

(65) Prior Publication Data
US 2018/0297318 A1    Oct. 18, 2018

Related U.S. Application Data

(60) Provisional application No. 62/242,500, filed on Oct. 16, 2015.

(51) Int. Cl.
*B32B 1/08*    (2006.01)
*G01F 23/00*   (2006.01)
(Continued)

(52) U.S. Cl.
CPC .............. *B32B 1/08* (2013.01); *F16L 11/02* (2013.01); *F16L 11/127* (2013.01); *G01F 23/00* (2013.01);
(Continued)

(58) Field of Classification Search
CPC .. F16L 11/127; F16L 9/16; F16L 11/18; F16L 11/118; F16L 11/12; B29C 53/60; B32B 1/08; G01F 23/26–268
(Continued)

(56) References Cited

U.S. PATENT DOCUMENTS 3,367,370 A * 2/1968 Sherlock .............. F16L 1/11
138/104
3,543,803 A * 12/1970 Chrow ............... F16L 11/127
138/103
(Continued)

FOREIGN PATENT DOCUMENTS

| CA | 807259 | * | 2/1969 |
| CA | 807259 A | | 2/1969 |
| WO | 03/044470 A1 | | 5/2003 |

OTHER PUBLICATIONS

Merriam-Webster, Definition of Splay, https://www.merriam-webster.com/dictionary/splay, p. 2 (Year: 2021).*
(Continued)

*Primary Examiner* — Lee E Sanderson
*Assistant Examiner* — Michael C Romanowski
(74) *Attorney, Agent, or Firm* — Fishman Stewart PLLC

(57) ABSTRACT

The present disclosure includes a composite tube with a stranded wire and a method for making same. The method may include providing a core and providing at least one layer comprising electrically conductive material. The method may further include applying the at least one layer around at least a portion of the core. The method may further (Continued)

include providing the stranded wire comprising an embedded portion. The method may further include embedding the embedded portion of the stranded wire within the at least one layer of electrically conductive material.

16 Claims, 12 Drawing Sheets

(51) Int. Cl.
*F16L 11/02* (2006.01)
*F16L 11/127* (2006.01)
*G01F 23/24* (2006.01)
*G01F 23/26* (2022.01)

(52) U.S. Cl.
CPC .............. *G01F 23/24* (2013.01); *G01F 23/26* (2013.01); *B32B 2305/188* (2013.01); *B32B 2307/202* (2013.01); *Y10T 428/1362* (2015.01)

(58) Field of Classification Search
USPC ............... 138/118–153; 428/36.91, 36.92
See application file for complete search history.

(56) References Cited

U.S. PATENT DOCUMENTS

| | | | | |
|---|---|---|---|---|
| 3,780,208 | A * | 12/1973 | Whittaker | F16L 11/127 174/47 |
| 4,675,780 | A * | 6/1987 | Barnes | F16L 11/127 138/103 |
| 5,921,285 | A * | 7/1999 | Quigley | D04C 1/06 138/125 |
| 6,004,639 | A * | 12/1999 | Quigley | F16L 11/12 428/36.3 |
| 2004/0081784 | A1* | 4/2004 | Smith | B29C 53/607 428/36.9 |
| 2004/0134555 | A1* | 7/2004 | Powell | B32B 7/12 138/141 |
| 2008/0006338 | A1* | 1/2008 | Wideman | F16L 11/081 138/126 |

OTHER PUBLICATIONS

International Search Report, PCT/US2016/057082, dated Jan. 12, 2017.

* cited by examiner

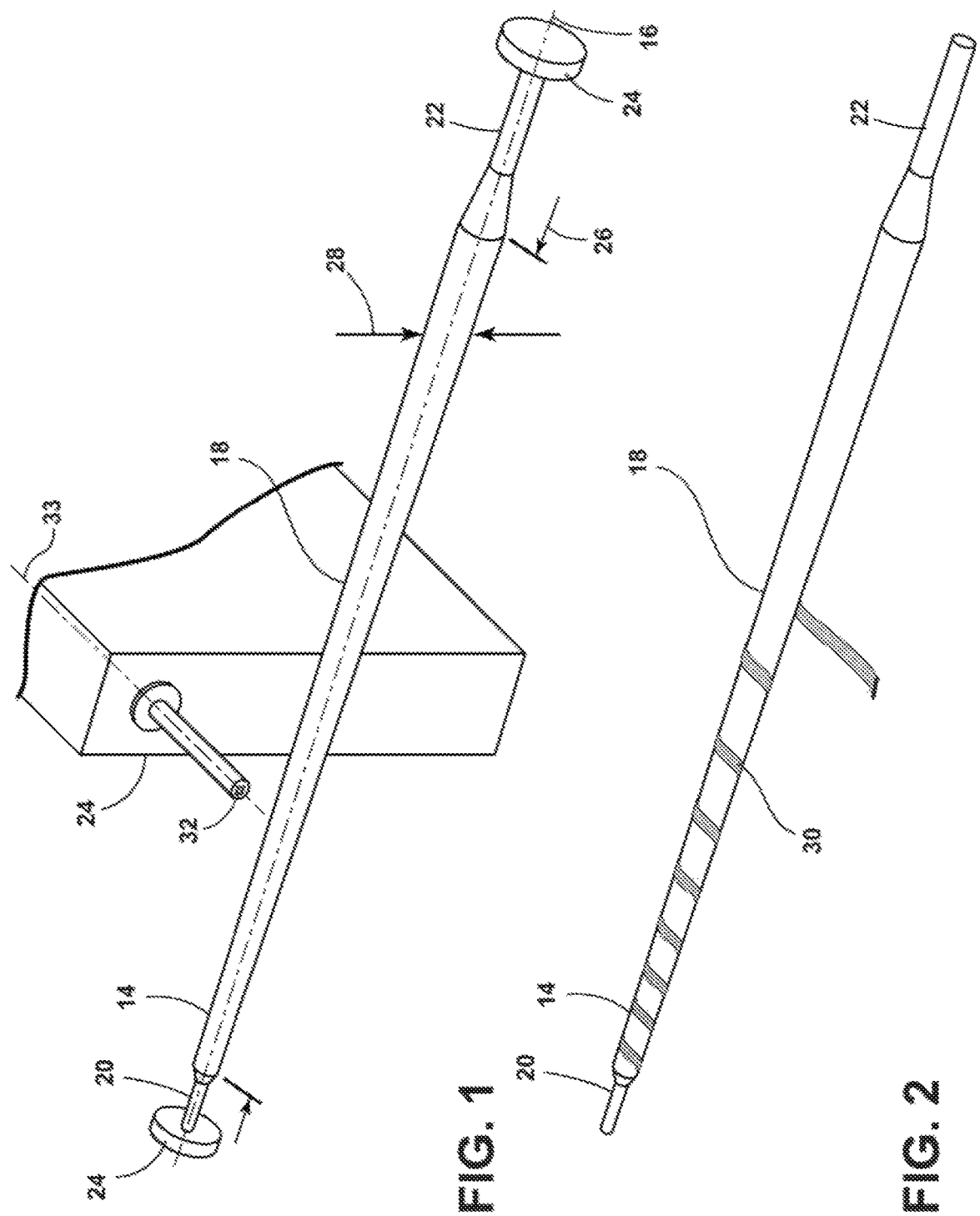

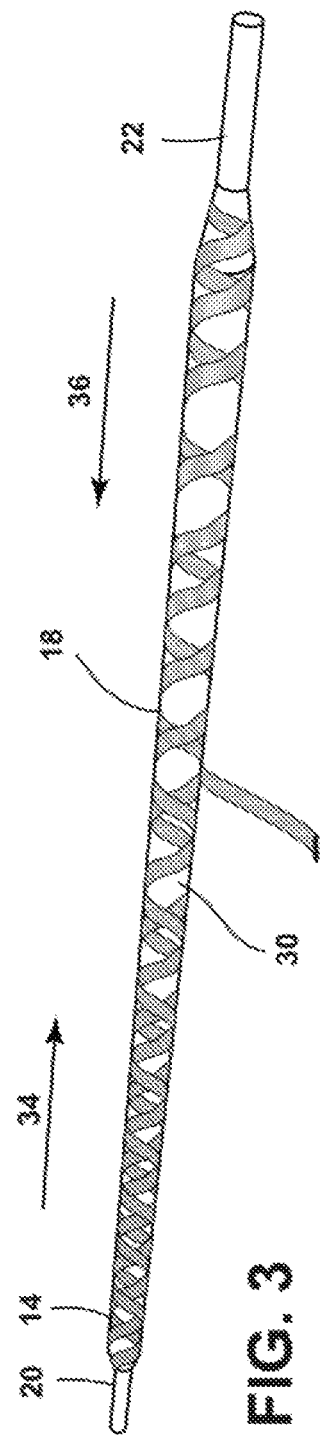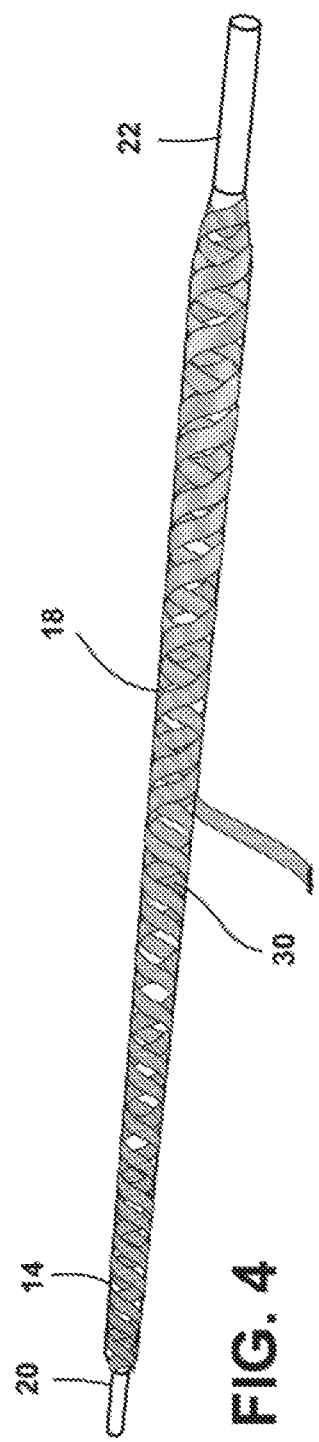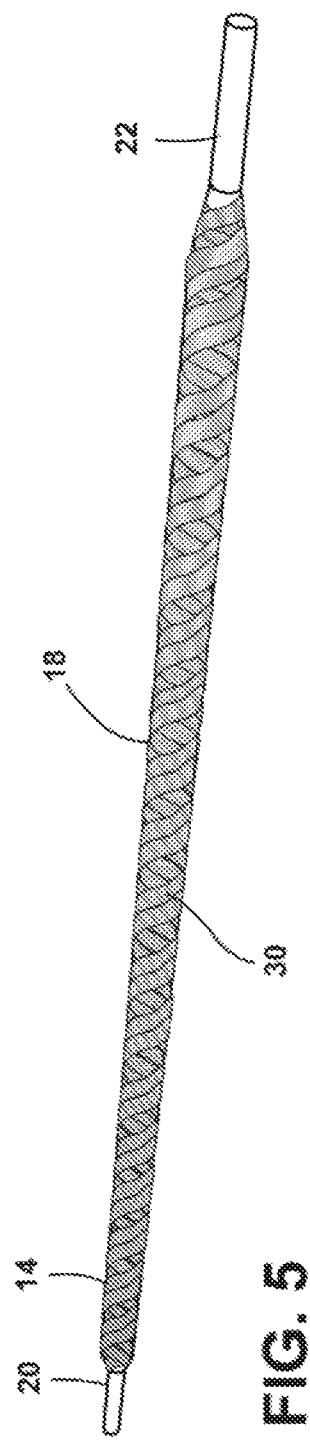

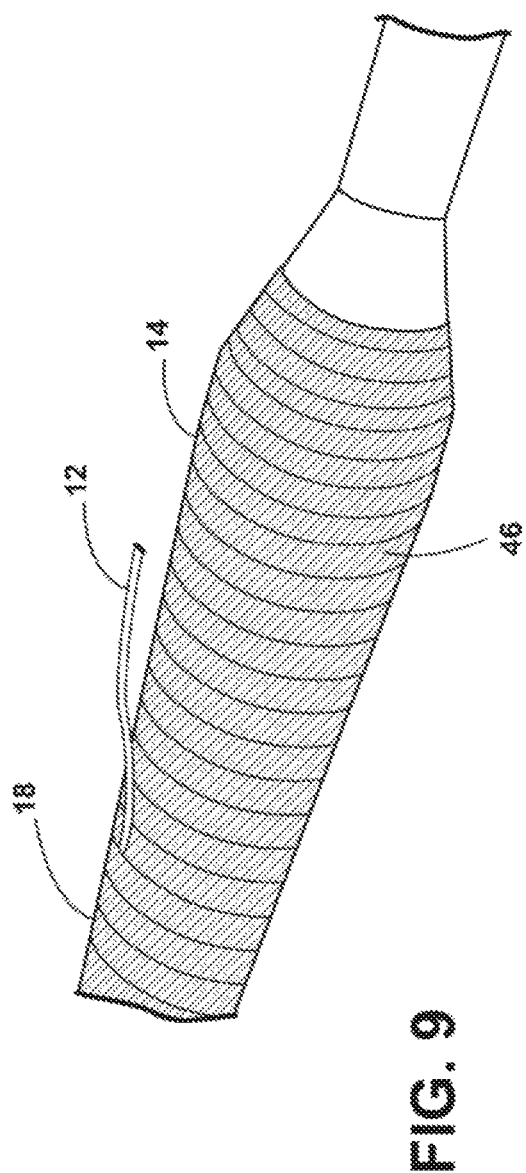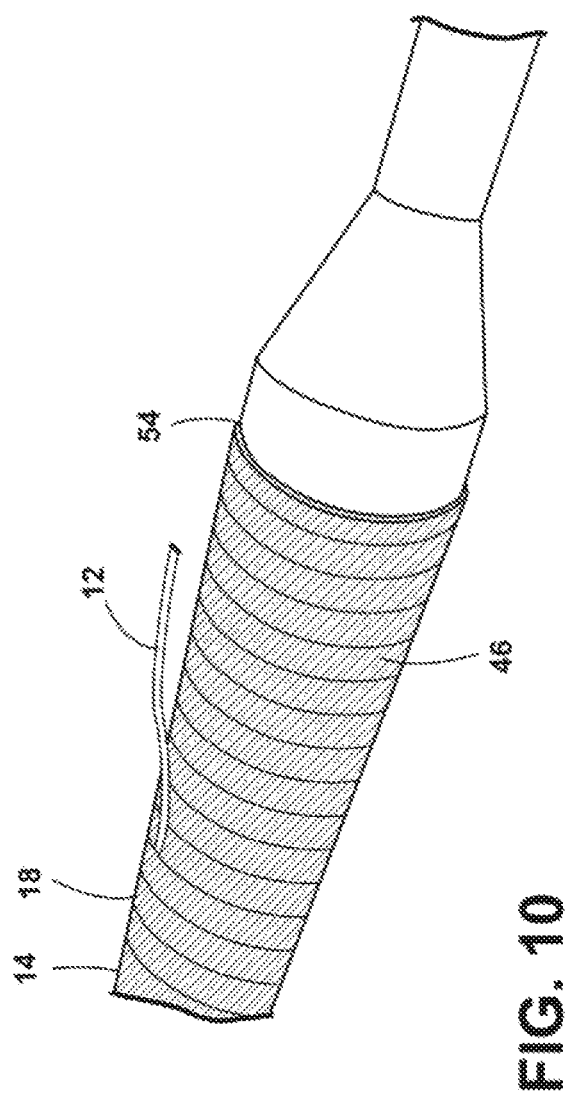

COMPOSITE TUBE WITH AN EMBEDDED STRANDED WIRE AND METHOD FOR MAKING THE SAME

CROSS-REFERENCE TO RELATED APPLICATION

This application is a National Stage Patent Application of International Patent Application No. PCT/US2016/057082, filed Oct. 14, 2016, which claims the benefit of U.S. Provisional Application Ser. No. 62/242,500, filed Oct. 16, 2015, the contents of both are incorporated by reference in their entireties.

TECHNICAL FIELD

The present disclosure relates to fluid systems, including fluid fuel systems that may be used with aircraft fuel gauging.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Aircraft may have the capability of determining the amount of fuel on board. Error in fuel gauging may be accounted for by additional fuel reserves. The more accurate on-board fuel gauging equipment is, the less fuel to be carried for a given route is required, which may result in a more economic flight operation.

Fuel gauging systems may use capacitance probes located in the tanks of aircraft. These fuel gauging capacitance probes may consist of a carbon-fiber composite tube with a stranded wire mechanically and electrically connected thereto. Carbon-fiber composite tubes may also be used for fuel or vent tubes, and it may be desired to ground or otherwise connect them using stranded wires. Rivets, screws, electrically conductive adhesives or epoxies may be used to couple the stranded wire and composite tube. However, a different form of connection may be desired.

Among other things, there can be a desire for solutions/options that enhance or improve one or more of the above-described features. The foregoing discussion is intended only to illustrate the present field and should not be taken as a disavowal of any measure of scope.

SUMMARY

In embodiments, a method for forming a composite tube with a stranded wire may include providing a core and providing at least one layer comprising electrically conductive material. The method may further include applying the at least one layer around at least a portion of the core. The method may further include providing the stranded wire comprising an embedded portion. The method may further include embedding the embedded portion of the stranded wire within the at least one layer of electrically conductive material.

In embodiments, a composite tube of a fuel gauging probe may include at least one layer of electrically conductive material and a stranded wire comprising an embedded portion disposed within the at least one layer of electrically conductive material. The at least one layer of electrically conductive layer may include a first layer surrounded at least in part by a second layer.

The composite tube with an embedded stranded wire and method for making the same described herein may provide the benefits of easier manufacturing and a more reliable electrical and physical connection between the stranded wire and composite tube. Furthermore, the composite tube described herein may result in a decreased resistance (e.g., less than one Ohm) between the stranded wire and the opposite end of the tube.

The foregoing and other aspects, features, details, utilities, and advantages of the present disclosure will be apparent from reading the following description, and from reviewing the accompanying drawings.

BRIEF DESCRIPTION OF THE DRAWINGS

FIG. 1 generally illustrates a perspective view of a portion of an embodiment of an apparatus/system for forming a composite tube.

FIG. 2 generally illustrates a perspective view of an embodiment showing a first strip of a first layer partially disposed around a core.

FIGS. 3-5 generally illustrate perspective views of an embodiment showing a first layer disposed around a core.

FIG. 9 generally illustrates a perspective view of an embodiment showing a first and/or second layer extending over a longitudinal end of a core.

FIG. 10 generally illustrates a perspective view of an embodiment showing a first and/or second layer removed from an end back to a trim point.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the invention to these embodiments. On the contrary, the disclosure is intended to cover alternatives, modifications and equivalents, which may be included within the spirit and scope of the disclosure.

Figure 1A:
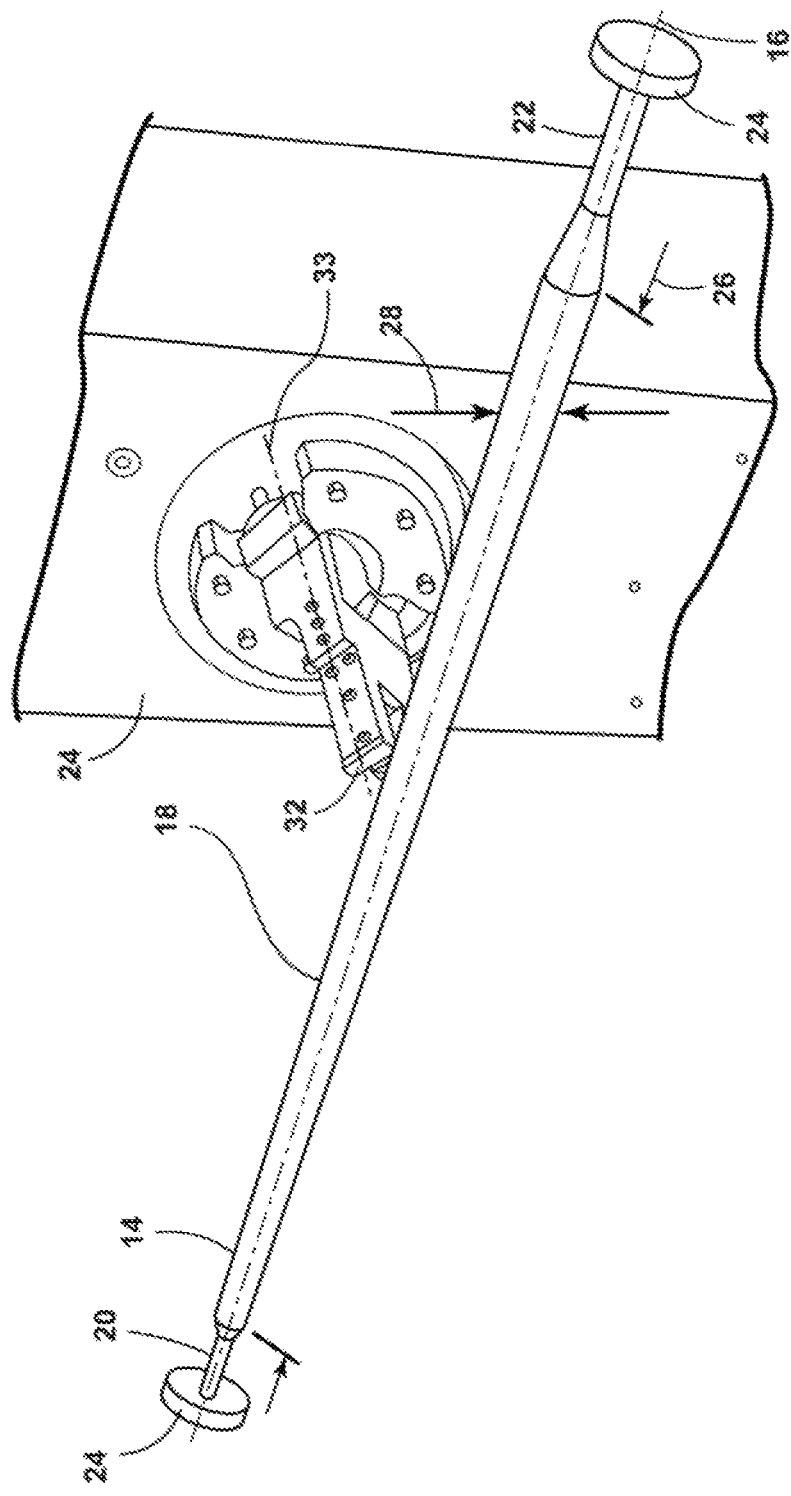
FIG. 1A generally illustrates a perspective view of a portion of another embodiment of an apparatus/system for forming a composite tube.

Referring now to the drawings wherein like reference numerals are used to identify identical components in the various views, FIGS. 1-15 illustrate methods for forming a composite tube 10 (FIG. 15) with an embedded stranded wire 12 (FIG. 6) in accordance with various embodiments of the present disclosure. Referring to FIGS. 1 and 1A, the method may begin with the step of providing a core 14. In the illustrated embodiment, core includes a longitudinal axis 16, a middle portion 18, and longitudinal end portions 20,22 that taper down from middle portion 18 relative to longitudinal axis 16. Middle portion 18 of core 14 may be configured to serve as a base for formation of composite tube 10. Longitudinal end portions 20, 22 may be configured to couple to or interface with a winding machine 24 such that core 14 may rotate about its longitudinal axis 16. In some embodiments, core 14 may be cylindrical and/or comprised of a metallic material (e.g., steel or aluminum). The coefficient of thermal expansion of the material of core 14 may affect the final diameters of tube 10, but this may be accounted for in the design of core 14. In one embodiment, a length 26 of middle portion 18 core 14 may be about 150 to 2000 millimeters, and a diameter 28 of middle portion 18 of core 14 may be about 12.5 to 100 millimeters.

Referring to FIGS. 2-5, the method may continue with the step of providing at least one layer comprising electrically conductive material. The method may continue with the step of applying a first layer 30 to core 14. In some embodiments, layer 30 may be comprised of an electrically conductive material, such as woven-fiber tape (e.g., fabric), which may be in the form of a tape strip, wound around core 14 relative to longitudinal axis 16. In one embodiment, electrically conductive material may comprise carbon fiber tape pre-impregnated with resin, which is sometimes to referred to as "prepreg". One of ordinary skill in the art will understand that layer 30 may be comprised of other materials and can be applied to core 14 in other ways.

In one embodiment, first layer 30 may be applied in a cross-ply fashion. First layer 30 may be applied via a spool 32 on winding machine 24 (FIG. 1) (e.g., by rotating core 14 about longitudinal axis 16 and traversing spool 32 of the electrically conductive material along core 14 in directions 34, 36 parallel to longitudinal axis 16). Referring to FIG. 3, in one embodiment, first layer 30 may be applied by (1) winding the electrically conductive material from spool 32 onto and around core 14 at a first angle in direction 34 at uniform intervals beginning at a first position, (2) winding the electrically conductive material from spool 32 onto and around core 14 at a second angle (which may be substantially perpendicular to the first angle (relative to a spool axis 33)) in direction 36 at uniform intervals beginning at a second position, and so on, until core 14 is covered with electrically conductive material to form cross-ply layer. One of ordinary skill in the art will understand that there are various ways of forming a cross-ply layer or other layer that sufficiently covers core 14 to form a suitable layer, and that different portions or segments of the core may be covered in different manners and thicknesses. Moreover, one of ordinary skill in the art will understand that the intervals described above can be uniform or non-uniform within or between the application of electrically conductive material in both directions 34, 36. In one embodiment, first layer comprises two cross-plies (i.e., four thicknesses of tape). However, one of ordinary skill in the art will understand that any number of layers and/or thicknesses may be used to sufficiently embed stranded wire 12 within tube 10 (FIG. 15).

Figure 6:
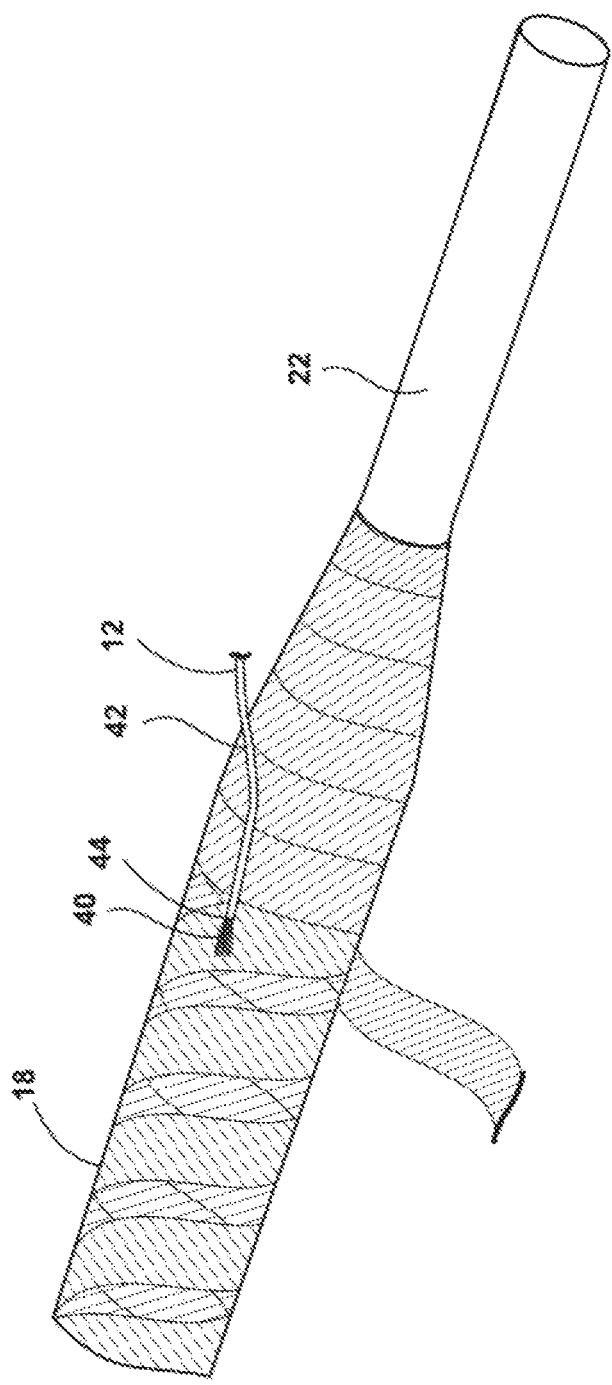
FIG. 6 generally illustrates a perspective view of an embodiment showing a portion of a stranded wire being disposed on or about a first layer.
Figure 15:
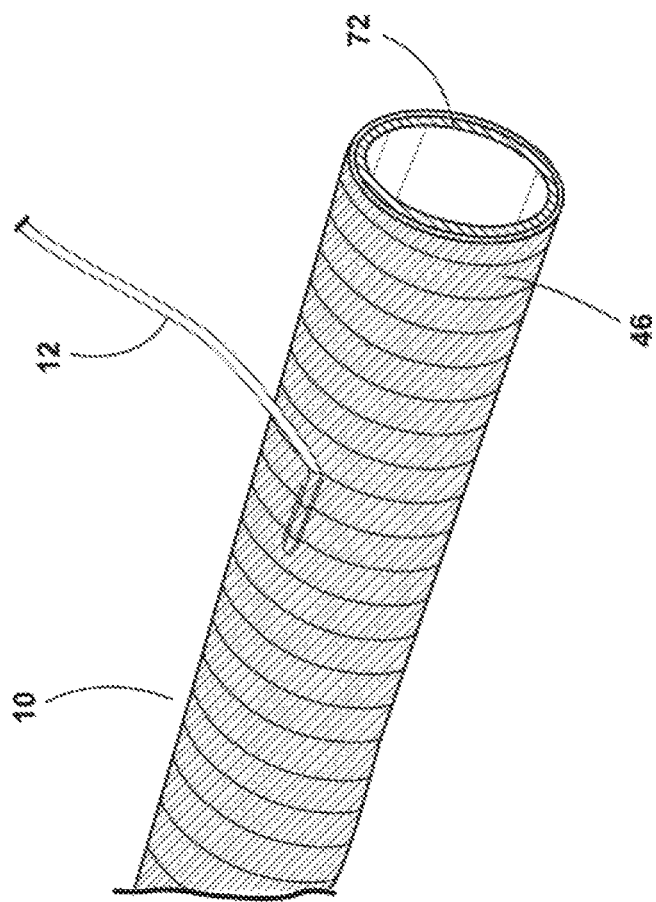
FIG. 15 generally illustrates a perspective view of an embodiment showing a composite tube with a cut end and a wire having a portion embedded within the composite tube and a portion extending from the composite tube.

Referring to FIG. 6, the method may continue with the step of providing a stranded wire 12 to be embedded within or onto composite tube 10 (FIG. 15). In an embodiment, stranded wire 12 may be configured to interface with a terminal block, an electrical connector, an electrical termination or a PCB with a capacitance measurement circuit on it. Stranded wire 12 may comprise a plurality of strands 40 (e.g., nineteen strands) encased within a tubing 42 (e.g., PTFE insulation), wherein the tubing 42 is removed from an end 44 of wire 12 to expose plurality of strands 40.

Figure 7:
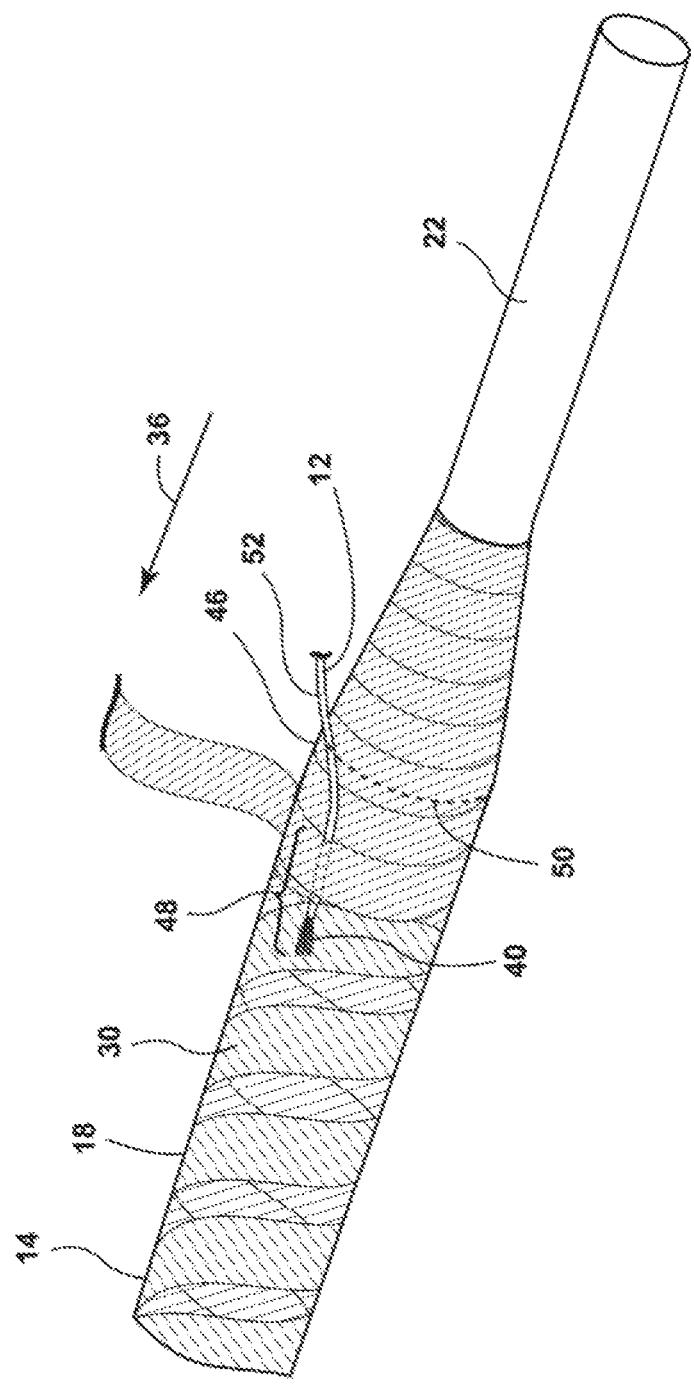
FIG. 7 generally illustrates a perspective view of an embodiment showing a portion of a stranded wire being embedded between portions of a first layer and a second layer.
Figure 8:
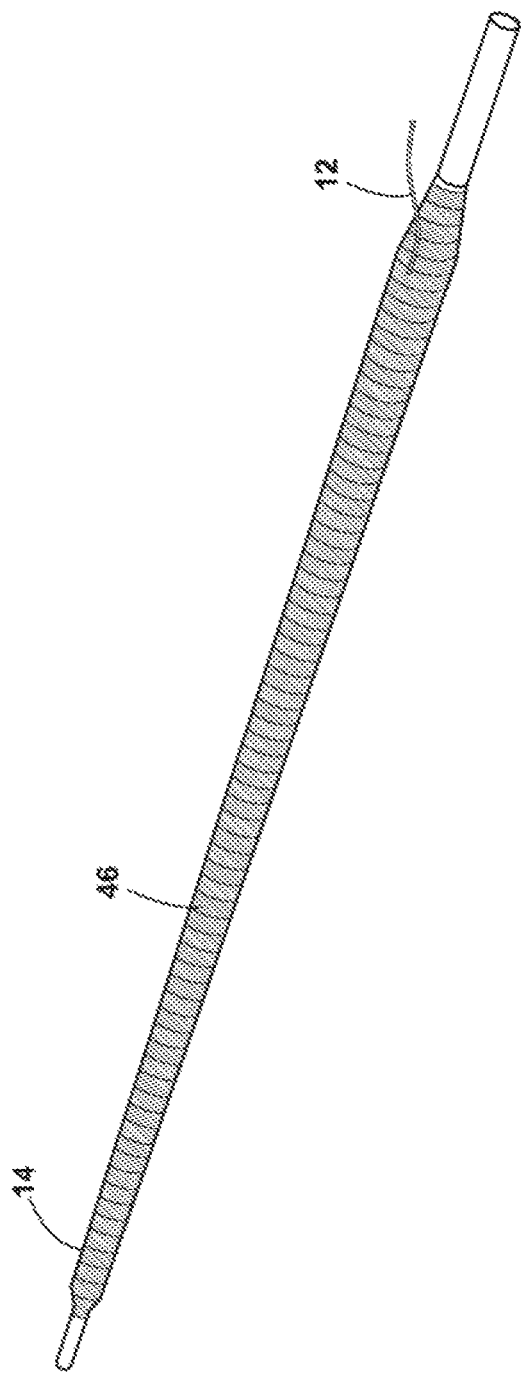
FIG. 8 generally illustrates a perspective view of an embodiment showing a portion of a stranded wire extending from a combination of a first layer and a second layer.

Referring to FIGS. 7-9, the method may continue with the steps of providing and applying a second layer 46 (finished layer shown in FIG. 8) around first layer 30 and embedding an embedded portion 48 of stranded wire 12 within at least one of (or between) first layer 30 and second layer 46. In some embodiments, second layer 46 may be comprised of an electrically conductive material, which can be the same as or different than the material of first layer 30. In an embodiment, this step can be accomplished via several substeps which may comprise: (1) applying the second layer 46 to a portion of core adjacent longitudinal end 22 of core 14; (2) pausing application of second layer 46; (3) positioning stranded wire 12 at a wire position proximate a longitudinal end 50 of middle portion 18 of core 14; (4) resuming application of second layer 46 to a portion of core 14 that is following a free end 52 of wire 12, such that embedded portion 48 of stranded wire 12 is embedded between first layer 30 and second layer 46. Positioning of stranded wire 12 at a wire position proximate a longitudinal end 50 of middle portion 18 of core 14 may be accomplished in a number of ways. For example, in one embodiment, plurality of strands 40 may be splayed in direction 36 over first layer 30. In other embodiments, however, wire 12 and/or plurality of strands 14 may be orientated at a number of different angles or positions to suit the exit direction of free end 52 of wire 12. Furthermore, in some embodiments, free end 52 may be about 45 to 120 millimeters in length; however, it may be smaller or larger depending on the application. In addition, although wire 12 is illustrated as being disposed at the wire position proximate the longitudinal end 50 of middle portion 18 of core 14, one of ordinary skill in the art will understand that wire 12 may be positioned at other locations along middle portion 18 of core 14.

One of ordinary skill in the art will also understand that there are various ways to embed wire between or within first and second layers. For example and without limitation, in other embodiments, second layer 46 may be omitted, and plurality of strands 40 of stranded wire 12 may be embedded within first layer 30. In the illustrated embodiment, second layer 46 may include electrically conductive material applied in a helical fashion. However, one of ordinary skill in the art will understand that second layer 46 may be applied in a number of different ways such that second layer 46 sufficiently covers core 14 to form a suitable layer. As can be seen in FIGS. 6-8, at least one of first and second layers 30, 46 may extend onto portions of longitudinal ends 20, 22 of core 14. When reversing direction 34, 36 upon applying first and/or second layers 30, 46, longitudinal ends 20, 22 may be useful to avoid the first and second layers 30, 46 from slipping back along core 14. In an embodiment, second layer may comprise one thickness (of tape); however, one of ordinary skill in the art will understand that any number of layers and/or thicknesses may be used to sufficiently embed stranded wire 12 within tube 10 (FIG. 15).

Referring to FIGS. 9 and 10, the method may continue with the step of removing portions of first and/or second layers 30, 46 disposed over longitudinal ends 20, 22 of core 14, for example, at a trim point 54. FIG. 9 shows longitudinal end 22 of core with first and/or second layers removed (trim point for longitudinal end 20 not illustrated, but can be disposed in a similar location). Removing the above-mentioned portions of first and/or second layers 30, 46 disposed over longitudinal ends 20, 22 of core 14 may aid in extracting core 14 from tube 10 (for example as further described hereinbelow).

Figure 11:
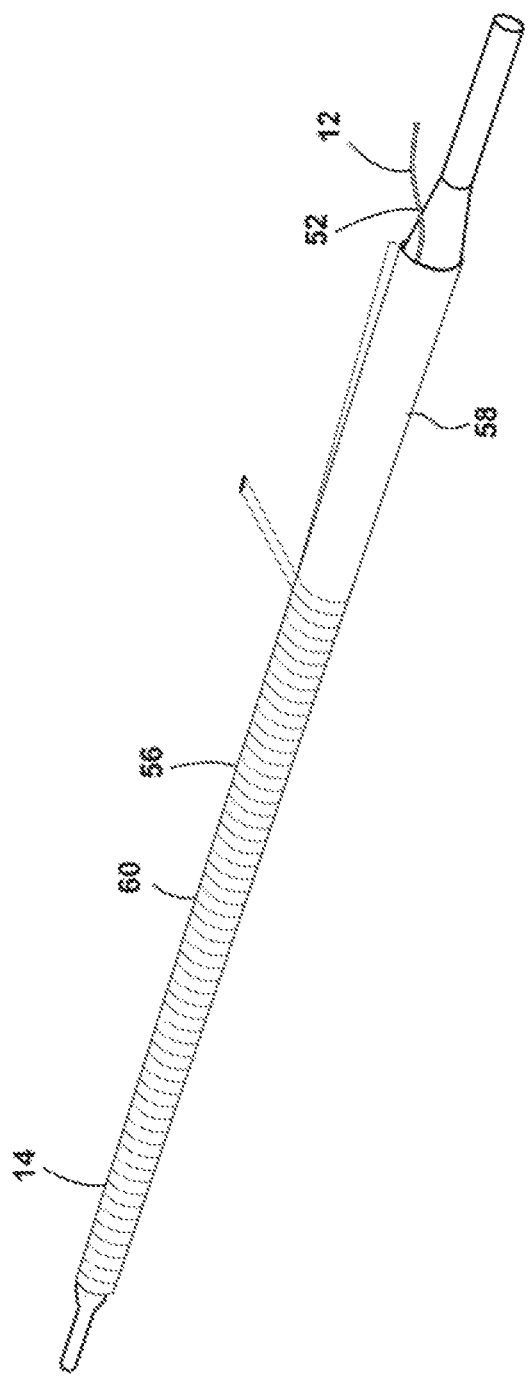
FIG. 11 generally illustrates a perspective view of an embodiment showing a portion of bagging layer disposed around a portion of a second layer.

Referring to FIG. 11, the method may continue with the step of applying a bagging layer 56 around second layer 46 (FIG. 10). This "bagging" or "consolidation" process may serve to remove air bubbles and excess resin from first and second layers 30, 46 and to ensure plurality of strands 40 of stranded wire 12 are firmly in place within or between first and second layers 30, 46. In an embodiment, the step of applying bagging layer 56 may comprise the substeps of (1) applying a release layer 58 around second layer 46, and (2) applying an adhesive layer 60 to secure release layer 58 around second layer 46. In some embodiments, release layer 58 may be comprised of a material that will not adhere to second layer 46, and adhesive layer 46 may comprise a tape material that is wound around release paper 58 (e.g., via winding machine 24—FIG. 1) in a helical fashion. Adhesive layer 46 may be applied "inside out"; i.e., a sticky side may be facing radially outwardly away from release layer 58, and a non-sticky side may be facing radially inwardly against release layer 58. In an embodiment, adhesive layer may comprise a material that when heated will shrink and, therefore, applying radially inwardly directed pressure onto release layer 58. Release layer 58 may be applied such that at least a portion of stranded wire 12 may be free from containment within release layer 58. One of ordinary skill in the art will understand that the step of applying a bagging layer 56 is optional and that, if utilized, can be performed in a number of different ways with various types of materials. For example and without limitation, a vacuum bagging process may be used. Moreover, bagging layer 56 can comprise one or multiple layers.

It is noted that in embodiments, an autoclave may alternatively be utilized in lieu of a tape, or adhesive layer, to apply a radially inwardly directed pressure. With an autoclave, air pressure may, for example, be simultaneously employed with heat in a chamber to provide a radially inwardly directed pressure.

Figure 12:
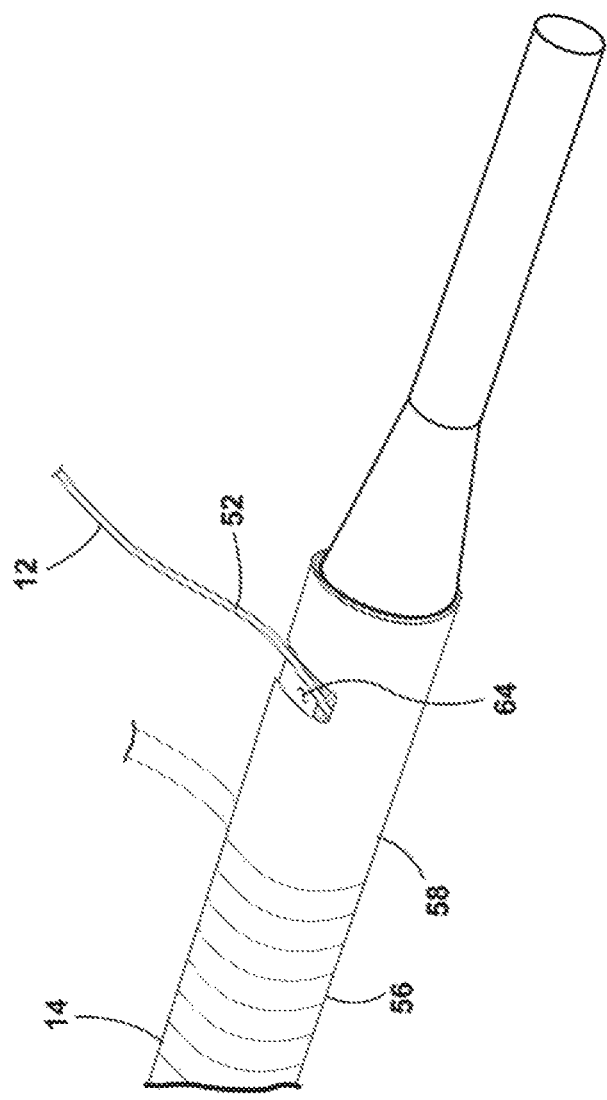
FIG. 12 generally illustrates a perspective view of an embodiment showing a portion of a wire extending through a port.

Referring to FIG. 12, the method may optionally include a step of modifying release layer 58 to include a port 64 through which free end 52 of stranded wire 12 may extend. In an embodiment, port 64 may be a slot that is cut into a portion of release layer 58 disposed over free end 52 of stranded wire 12. One of ordinary skill in the art will understand that port 64 may be of any shape or size. Port 64 may result in a better surface area of tube 10 since by allowing the wire 12 to extend through port 64 and away from core 14, no impression may be made (from wire 12 onto layers 30, 46). It may be desirable to have a good surface finish of the formed tube 10 (FIG. 15).

Figure 13:
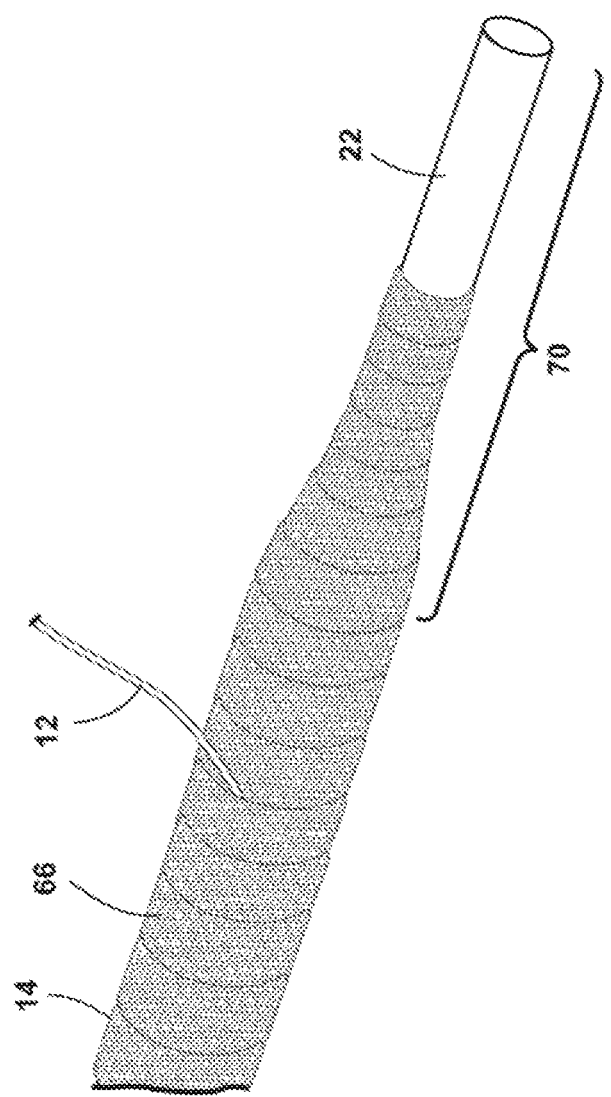
FIG. 13 generally illustrates a perspective view of an embodiment showing a collection layer disposed around a core and covering the first and second layers.

Referring to FIG. 13, the method may include a step of applying a collection layer 66 around core 14. If the step of applying bagging layer 56 is performed, then collection layer 66 may be disposed around bagging layer 56. Collection layer 66 may be configured to collect any resin (or other debris) that may escape once tube 10 is placed in a curing oven 68 (e.g., FIG. 14) for curing of first and second layers 30, 46 (described in more detail hereinbelow). Collection layer 66 may also serve to help contain stranded wire 12. In one embodiment, collection layer 66 may comprise bleeder cloth, which may be wound (or otherwise disposed) around core 14 in a helical fashion (e.g., via winding machine 24—FIG. 1). One of ordinary skill in the art will understand that collection layer 66 may be optional and that different materials/methods may be used.

Figure 14:
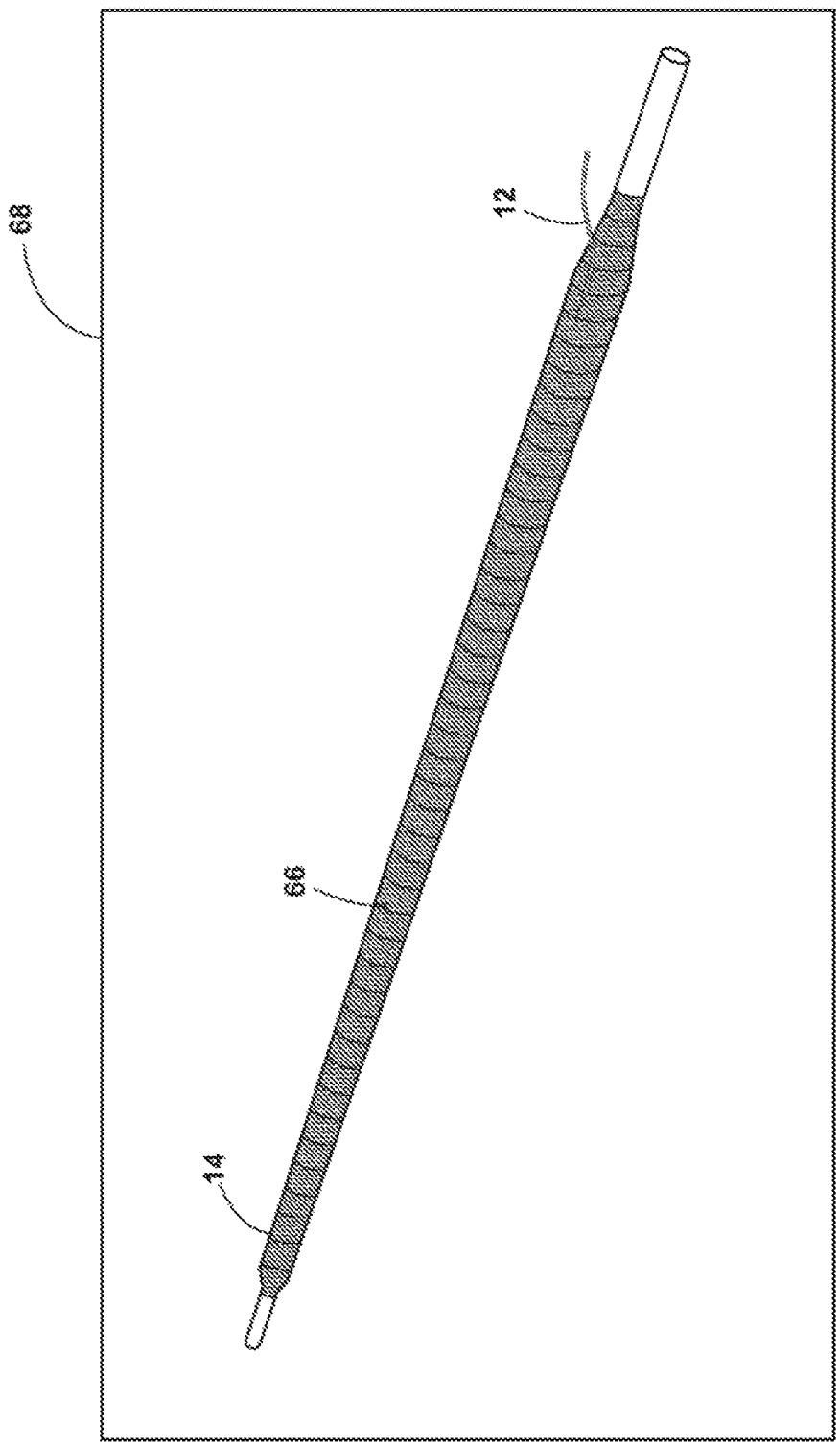
FIG. 14 generally represents a core with a first layer and second layer enclosed within a collection layer, the foregoing collectively provided within a curing oven.

Referring to FIG. 14, the method may include a step of curing first and second layers 30, 46. In one embodiment, core 14 may be placed into curing oven 68 for a total curing time of six hours. In some embodiments, a curing temperature of curing oven 68 may be 175 degrees Celsius for a 130-minute period within the total curing time, with the remainder of the total curing time including temperature ramp-up and ramp-down periods. The curing duration and temperature may vary depending on the materials used. For example, products with a larger thermal mass may need more gentle ramp-up and ramp-down periods.

Thereafter, the method may continue with the step of cooling first and second layers, 30, 46.

Referring to FIG. 15, the method may include a step of removing collection layer 66 and bagging layer 56 from core 14.

The method may continue with the step of extracting composite tube 10 (which at this point may include first and second layers 30, 46 and embedded stranded wire 12) from core 14. This can be accomplished in various ways known in the art.

The method may include a step of removing trimmed portions 70 (FIG. 13) of core 14. FIG. 15 illustrates composite tube 10 with trimmed portion 70 removed. The step of removing trimmed portions 70 may be accomplished via a cutting wheel. Although trimmed port at the other longitudinal end of tube 10 is not shown, it may be similarly located as trimmed portion 70 is relative to longitudinal end 22 of core 14 (longitudinal ends 20, 22 of core 14 shown in FIG. 5).

Still referring to FIG. 15, the method may include a step of sealing cut ends 72 of tube 10. In an embodiment, cut ends 72 of tube 10 may be sealed, for example, with a polyurethane varnish or other suitable sealant. Although the cut end 72 at the other longitudinal end of tube 10 is not illustrated, it may be similarly located as cut end 72 is relative to longitudinal end 22 of core 14 (longitudinal ends 20, 22 shown in FIG. 5).

Although the layers described hereinabove involve covering the entire middle portion 18 and portions of longitudinal ends 20, 22 of core 14, it should be understood that each of the above-described layers may be applied to less or more portions of core 14 as well.

Still referring to FIG. 15, in some embodiments, a composite tube 10 for a fuel gauging probe may include at least one layer 30, 46 of electrically conductive material. The at least one layer 30, 46 may comprise first layer 30 surrounded at least in part by second layer 46. Composite tube 10 may also include a stranded wire 12 comprising an embedded portion 48 disposed within the at least one layer 30, 46. First layer 30 may be comprised of an electrically conductive material that is formed in a cross-ply fashion. Second layer 46 may be comprised of an electrically conductive material that is formed around first layer 30 in a helical fashion. In one embodiment, stranded wire 12 may include a plurality of strands 40 that are splayed toward longitudinal end 20 (FIG. 5) of core 14 in direction 36 (FIG. 7). Composite tube 10 may also include ends 72 that may be sealed with a varnish. In an embodiment, tube 10 may for example be about five hundred millimeters in length.

Although the disclosure describes a composite tube with an embedded stranded wire to be used in a fuel gauging probe, the composite tube described in the instant disclosure can be used in several applications and industries in which any fluid level is to be monitored (e.g., using float mechanisms, etc.).

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A composite tube comprising:
    a first layer including electrically conductive material;
    a stranded wire comprising a plurality of strands encased within a tubing; and
    a second layer including electrically conductive material;
        where a portion of the stranded wire is embedded between a portion of the first layer and a portion of the second layer, and at an end of the portion of the stranded wire, the tubing is removed such that a portion of the plurality of strands is not encased within the tubing, but is embedded between the portion of the first layer and the portion of the second layer,
            wherein the plurality of strands not encased within the tubing but embedded between the portion of the first layer and the portion of the second layer are splayed toward a longitudinal end of the composite tube.

2. The composite tube of claim 1, wherein the first layer and second layer comprise the same electrically conductive material.

3. The composite tube of claim 1, wherein the electrically conductive material of the first layer and/or the second layer comprises a woven fiber or fabric tape.

4. The composite tube of claim 1, wherein the electrically conductive material of the first layer and/or the second layer comprises a carbon fiber tape pre-impregnated with resin.

5. The composite tube of claim 1, wherein the first layer comprises a tape strip disposed in a helical configuration.

6. The composite tube of claim 1, wherein the first layer comprises at least two fabric tape strips disposed about a longitudinal axis.

7. The composite tube of claim 6, wherein the at least two fabric tape strips are in a cross-ply configuration.

8. The composite tube of claim 1, wherein the first layer comprises two cross-ply strips of tape.

9. The composite tube of claim 6, wherein the second layer comprises a fabric tape strip disposed about the longitudinal axis over at least a portion of the first layer.

10. The composite tube of claim 6, wherein the second layer comprises at least two fabric tapes disposed about the longitudinal axis over at least a portion of the first layer.

11. The composite tube of claim 1, wherein the first layer comprises at least two cross-ply fabric tape strips and the second layer comprises at least two cross-ply fabric tape strips.

12. The composite tube of claim 1, wherein the stranded wire is configured to interface with a connector, circuit board, or electronic device.

13. The composite tube of claim 1, wherein the first layer and the second layer are cured.

14. The composite tube of claim 1, wherein the composite tube includes sealed tube ends.

15. The composite tube of claim 1, wherein the composite tube is configured for use in or with a gauging probe.

16. A liquid level indicator probe comprising a composite tube, said composite tube comprising:
    a first layer including electrically conductive material;
    a stranded wire comprising a plurality of strands encased within a tubing; and
    a second layer including electrically conductive material;
        where a portion of the stranded wire is embedded between a portion of the first layer and a portion of the second layer, and at an end of the portion of the stranded wire, the tubing is removed such that a portion of the plurality of strands is not encased within the tubing, but is embedded between the portion of the first layer and the portion of the second layer,
            wherein the plurality of strands not encased within the tubing but embedded between the portion of the first layer and the portion of the second layer are splayed toward a longitudinal end of the composite tube.

\* \* \* \* \*